United States Patent
Sadeghian Marnani et al.

(10) Patent No.: US 12,546,800 B2
(45) Date of Patent: Feb. 10, 2026

(54) AUTOMATED LANDING METHOD OF A SCANNING PROBE MICROSCOPY SYSTEM AND SCANNING PROBE MICROSCOPY SYSTEM USING THE SAME

(71) Applicant: Nearfield Instruments B.V., Rotterdam (NL)

(72) Inventors: Hamed Sadeghian Marnani, Rotterdam (NL); Jianfei Yang, Eindhoven (NL)

(73) Assignee: Nearfield Instruments B.V., Rotterdam (NL)

( * ) Notice: Subject to any disclaimer, the term of this patent is extended or adjusted under 35 U.S.C. 154(b) by 384 days.

(21) Appl. No.: 18/275,437

(22) PCT Filed: Feb. 9, 2022

(86) PCT No.: PCT/NL2022/050064
§ 371 (c)(1),
(2) Date: Aug. 2, 2023

(87) PCT Pub. No.: WO2022/173294
PCT Pub. Date: Aug. 18, 2022

(65) Prior Publication Data
US 2024/0110939 A1 Apr. 4, 2024

(30) Foreign Application Priority Data
Feb. 9, 2021 (NL) .................................. 2027524

(51) Int. Cl.
*G01Q 10/06* (2010.01)
*G01Q 10/02* (2010.01)
(Continued)

(52) U.S. Cl.
CPC ............ *G01Q 10/065* (2013.01); *G01Q 10/02* (2013.01); *G01Q 20/02* (2013.01); *G01Q 20/04* (2013.01); *G01Q 40/02* (2013.01)

(58) Field of Classification Search
CPC ...... G01Q 10/065; G01Q 10/02; G01Q 20/02; G01Q 20/04; G01Q 40/02
See application file for complete search history.

(56) References Cited

U.S. PATENT DOCUMENTS

| 5,142,145 A | 8/1992 | Yasutake |
| 11,320,457 B2 * | 5/2022 | Herfst .................... G01Q 40/00 |

(Continued)

OTHER PUBLICATIONS

International Search Report and Written Opinion—PCT/NL2022/050064—mailing date Aug. 18, 2022.

*Primary Examiner* — Nicole M Ippolito
(74) *Attorney, Agent, or Firm* — Banner & Witcoff, Ltd.

(57) ABSTRACT

The present disclosure relates to a method of operating an SPM system including a landing procedure. The landing procedure comprises a first landing stage including a first translation over a first actuation distance by a coarse translation means to bring a probe tip held by an SPM head from an initial separation from a substrate to be probed to a second, more proximal, separation as defined by a characteristic transitional response of the probe tip in proximity to the substrate. Following the first stage a second translation is applied, over a second actuation distance by a fine translation means under feedback control to bring the probe tip to a working separation. Prior to applying the first (coarse) actuation distance an initial optical distance is determined which is indicative of the initial separation, using a detector, preferably a mark sensor. The measured initial optical distance is related to a reference distance so as to determine a deviation. The first actuation distance corresponds the reference distance and the deviation. The disclo- (Continued)

sure also relates to an SPM system and software product arranged to implement the landing method.

20 Claims, 7 Drawing Sheets

(51) Int. Cl.
    *G01Q 20/02*     (2010.01)
    *G01Q 20/04*     (2010.01)
    *G01Q 40/02*     (2010.01)

(56) References Cited

U.S. PATENT DOCUMENTS

| | | |
|---|---|---|
| 2009/0293160 A1 | 11/2009 | Lee et al. |
| 2011/0035848 A1 | 2/2011 | Perkins et al. |
| 2017/0082685 A1* | 3/2017 | Ukraintsev ...... G01R 31/31728 |
| 2023/0323437 A1* | 10/2023 | Chen .................... C12Q 1/6816 |

* cited by examiner

AUTOMATED LANDING METHOD OF A SCANNING PROBE MICROSCOPY SYSTEM AND SCANNING PROBE MICROSCOPY SYSTEM USING THE SAME

CROSS-REFERENCE TO RELATED APPLICATIONS

This application is a U.S. National Stage application under 35 U.S.C. § 371 of International Application PCT/NL2022/050064 (published as WO 2022/173294 A1), filed Feb. 9, 2022, which claims the benefit of priority to Application NL 2027524, filed Feb. 9, 2021. Each of these prior applications is hereby incorporated by reference in its entirety.

TECHNICAL FIELD AND BACKGROUND

The present invention relates to a landing method and apparatus, which are capable of providing effective and reliable landing for a scanning probe microscope. More specifically, the present disclosure relates to an automatic landing method for a scanning probe microscope (SPM) and an SPM system using the same.

Scanning probe microscopes are widely used for characterizing properties of a sample by the interaction between a probe device and a sample. The probe can be mounted in a scanning probe microscope (e.g. an atomic force microscope). Commonly, cantilever-based probes are employed, which may have a probe tip provided near a terminal end of the cantilever to locally probe, measure, one or more properties of the sample. Probe based systems can characterize small-scale sample features by monitoring the interaction between the sample and the tip of the associated probe device.

A landing procedure in which the probe tip is brought into a working distance, working separation, from the substrate typically includes two steps or stages. Specifically, the probe is typically first brought from an initial separation to an approximate distance from the substrate from which the probe is then accurately guided to the sample position.

In a semi-automatic method of landing or approach method, the first stage typically involves a coarse motion, e.g. by manual manipulation and experience of a user, typically via an image information display. The second stage is typically an automated process using a fine motion, where the probe is automatically driven until a desired condition, e.g. a resonance amplitude, is met, e.g. by monitoring the condition during the driving step. Evidently, the time required for and the overall efficiency of an semi-automated landing procedure depends on user proficiency.

In an automated landing method, manual manipulation during the first stage is eliminated by providing automated coarse motion until a desired transition condition is satisfied by periodic comparison of a cantilever response signal and the set point at regular intervals for each step during the coarse motion stage.

As compared to the semi-automatic landing method, which may be rapidly driven by a proficient user in the coarse motion, the landing speed in the automatic landing method is limited by the feedback control required during the coarse motion, irrespective of the initial separation distance between the sample and the probe tip.

SUMMARY

Therefore it is an object of the present disclosure to provide a landing method that is capable of effectively achieving an effective landing at a uniform speed and/or that is less time consuming, irrespective of apparent initial separation between probe and target.

It is another object of the present disclosure to provide a SPM system and/or software product arranged to implement the landing method.

Aspects of the present disclosure relate to a method of operating an SPM system, in particular to a method comprising a landing procedure, and to an SPM system configured to perform the method.

The SPM system comprises an SPM head for probing a substrate to be probed with a probe tip held by the SPM head, a controller, and a translation means for adjusting a separation between the probe tip and the substrate. The translation means is communicatively connected to the controller, and includes a course translation means for bringing the probe tip from an initial separation from the substrate to a more proximal separation, and a fine translation means for bringing the probe tip to a working separation.

The method of operating an SPM system comprises a landing procedure. The landing procedure comprises: a first landing stage that includes applying a first translation over a first actuation distance by a coarse translation means to bring a probe tip held by an SPM head from an initial separation from a substrate to be probed to a second, more proximal, separation as defined by a characteristic transitional response of the probe tip in proximity to the substrate; a second landing stage that includes applying a second translation, following the first (coarse) translation, over a second actuation distance by a fine translation means under feedback control to bring the probe tip to a working separation; and the steps of measuring an initial optical distance, indicative of the initial separation, using a detector, and relating the measured initial optical distance to a reference distance so as to determine a deviation; wherein, the first actuation distance corresponds the reference distance and the deviation.

Providing the first (coarse) translation over an actuation distance that corresponds to the reference distance and the determined deviation advantageously reduces the time spent on the first stage of the landing procedure, i.e. the time required to bring the probe tip to from an initial separation from a substrate to be probed to a second, more proximal, separation. The present method was found to offer reliable landing by setting the coarse translation distance in dependence of measured initial optical distance and a predetermined, trained, reference distance. The present method was found to offer a significant reduction in landing time since the first translation distance at a given target measurement position along a substrate can be determined by a limited number of input signals, typically including a single optical measurement at the target sampling position. Among others this allows covering essentially the complete first actuation distance by applying a single coarse actuation parameter as opposed to known methods that rely on feedback control, i.e. monitoring a response flowing application of each coarse translation step.

Advantageously, the present method allows repeatedly applying the landing procedure including the first coarse translation in dependence of the reference distance and the deviation for a plurality of target measurement areas along the substrate to be probed, reducing the overall time needed to address the plurality of target areas. The improvement in overall time can be considered of particular relevance for large substrates and/or for substrates having a spread in apparent initial separation between tip and substrate between target measurements areas, e.g. due to variations in substrate thickness or variations due to a bow.

The separation between probe tip and the substrate can be correlated to a determined optical distance using a suitably positioned detector. Typically, the detector is provided in a fixed relation to a position for holding the probe tip, e.g. along the SPM head at a fixed lateral offset from a means for mounting the probe, so that a determined optical distance between substrate and detector can be indicative for the separation between the substrate and the probe tip. Using an optical detection principle advantageously allows determining a separation distance is a fast and reliable manner, irrespective of physical properties such as conductivity or capacitance of the probe and/or substrate.

The reference distance is determined in a calibration routine prior to the first landing stage. The calibration routine includes: a) measuring a reference optical distance associated with the probe tip held by the SPM head positioned at a reference separation from a reference; and b) determining the reference distance by recording an actuation distance required to bring the probe tip from the reference separation to a second, more proximal, reference separation as defined by an observed characteristic transitional response of the probe tip in proximity to the reference, e.g. by monitoring a phase transition of a driven cantilever beam, as the tip approaches the substrate. The calibration routine can be understood as a training that is performed on a reference so as to provide a safe coarse actuation distance (reference distance), which is associated to a reference optical distance and via the reference optical distance to a corresponding separation between the substrate and a given probe tip. The time spent to determine the safe coarse actuation distance can be understood to be comparable to a course translation stage of an automated lancing procedure with the distinction that the calibration or training routine need not be supplemented by a fine translation stage.

In a preferred embodiment, determining the reference distance comprises recording an actuation parameter for the coarse translation means associated to the required actuation distance, e.g. by counting the number of coarse translation steps for a stepper motor. The measured optical distance is coupled with the number of steps from the stepper motor.

The difference between the reference optical distance and an optical distance measured at a target landing site is used to determine the safe coarse actuation distance for that target landing area, for example, by adding the difference to the predetermined reference. The determined safe distance can be used to advantage during the first landing stage, e.g. by actuating the coarse translation means to reduce the separation by said distance, e.g. by applying an actuation parameter for the coarse translation means associated to the required actuation distance. Advantageously, the coarse translation towards substrate can be performed without feedback control while still effectively bringing the probe tip from an initial separation from the substrate to a separation that corresponds to the second, more proximal, separation.

Typically the detector is part of the SPM system, e.g. integrated with or provided along the SPM head. It will be understood that the detector need not be an integral part of the head but head. The optical distance can be determined with the detector at an alternate position e.g. using suitably placed mirrors. Preferably, measuring the optical distance is performed with an optical distance sensor. In a preferred embodiment, the optical distance is correlated to a focusing condition of the optical distance sensor, e.g. by maximizing an optical contrast within optical images of the reference.

In some embodiments, the calibration or training routine is performed on a reference area of the substrate to be probed. In a preferred embodiment, the reference distance is defined relative to a fixed reference, e.g. a fiducial provided to a stage for holding the substrate. The fiducial characterized in having properties, e.g. surface pattern, that allow it to be registered optically, e.g. by the optical distance sensor. The fiducial is preferably further characterized in having properties, e.g. a suitable surface finishing or structuring, that allow it to be contacted or scanned by the probe tip. Preforming the calibration routine on a fiducial provided to or along a stage for holding the substrate allows determining the reference distance and/or the corresponding actuation parameter under controlled conditions. Preforming the calibration routine on a fiducial provided on or along the sample stage has as additional benefit that the calibration is performed in the direct vicinity of the substrate, thus reducing time spend on lateral and/or vertical translations.

In some embodiments, the calibration routine further includes determining a second reference distance by recording a fine actuation distance required to bring the probe tip from the second, more proximal, reference separation to a working separation from the reference (fiducial). Or in other words, the calibration or training routine need is supplemented by a fine translation stage so as to determine a second reference distance that corresponds to the fine translation distance required to bring the probe tip into contact with the reference, or fiducial, as the case may be. Similar to determining the coarse reference distance, the required fine translation can be correlated to an actuation parameter for the fine translation means, e.g. a potential that is to be applied to a piezo transducer or a z-stage associated to the SPM head. The second reference distance or actuation parameter for the fine translation means may be used to further reduce the landing time by at least partly reducing the distance that needs to be covered under feedback control, e.g. by covering at least part of fine translation distance without feedback control. Accordingly, in some embodiments, the method comprises an intermediate translation between the first and the second translation, said intermediate translation including an intermediate translation by the fine translation means without feedback control, wherein the intermediate translation is provided over a distance that corresponds to a fraction, e.g. between 0 and about 80% or between 10 and 60%, e.g. about 50% of the second reference distance.

In particularly preferable embodiments the method further comprises a step of recording an optical height map of a substrate to be probed. The height map includes optical height records covering individual ones of a plurality of target measurement areas along the substrate relative to a marker having a fixed relation to the substrate to be probed, preferably the fiducial. While the marker can in principle be any specific area, e.g. the reference area on a substrate to be probed, the records are preferably related to the fiducial. Determining the optical height map of a substrate to be probed obviates a need for performing optical measurements at each between subsequent landing procedures, which enables a further reduction of overall process time as a reduced amount of time is spent on switching (activating/deactivation) of optical measurement sensors and/or lateral translations, in particular with increasing numbers of target measurement areas along a given substrate.

Determining an optical height map of the substrate can have the additional benefit of reducing a risk of tip and/or sample damage during lateral translations as potential variations in substrate height are determined beforehand. Alternatively, or in addition, determining an optical height map of the substrate can have the benefit of enabling a comparatively lower safe travel height during lateral translations, which can reduce the time, e.g. a number of coarse translation steps, during the landing.

Further, and importantly, determining the optical height map of the substrate and relating the height records to the marker, preferably the fiducial, improves robustness of the method and/or reduces idle time of the system, e.g. following a probe exchange. Because the optical height information is correlated to a fixed reference point, e.g. the fiducial, the optical height, once determined, can be used even after a probe exchange, e.g. by performing a new calibration procedure at the fiducial. The optical measurement can be understood to be a one-time calibration (referring to the relation between optical distance and coarse translation), which only needs to be re-calibrated when changing the fiducial and/or the approach motor.

Additionally, the optical height map can be used to particular advantage in SPM systems comprising a plurality of individually addressable ones of the SPM head, e.g. systems wherein each head is individually translatable by corresponding ones of the coarse and fine translation means. By using a plurality of individually addressable ones of the SPM heads a larger substrate can be analyzed in a shorter time parallel operation of the heads, each addressing a particular area of the substrate. By relating the height records in the map to a fixed reference point, e.g. the fiducial, each head can benefit from a single set of data, e.g. by performing a calibration procedure on the reference point.

According to another or further aspects the present disclosure relates to an SPM system and or software product arranged to implement the method of operation including the landing method.

The SPM system comprises an SPM head for probing a substrate to be probed with a probe tip held by the SPM head, a controller, and a translation means for adjusting a separation between the probe tip and the substrate, the translation means communicatively connected to the controller, and including a course translation means for bringing the probe tip from an initial separation from the substrate to a more proximal separation, and a fine translation means for bringing the probe tip to a working separation, wherein the SPM system is configured for performing a landing procedure including applying a first translation over a first actuation distance by the coarse translation means to bring a probe tip held by an SPM head from an initial separation from a substrate to be probed to a second, more proximal, separation as defined by a characteristic transitional response of the probe tip in proximity to the substrate, and applying a second (fine) translation, following the first (coarse) translation, over a second actuation distance by the fine translation means under feedback control to bring the probe tip to a working separation, and measuring an initial optical distance, indicative of the initial separation, using a detector, and relating the measured initial optical distance to a reference distance so as to determine a deviation wherein, the first actuation distance corresponds to a predetermined reference actuation distance associated to the reference distance and the deviation.

The disclosure is further directed to a computer program product comprising instructions, e.g. computer readable instructions stored on a non-transient computer readable medium, which loaded into a memory of a scanning probe microscopy system according to the disclosure, enable the controller of the system to carry out the method of operation including the landing method.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
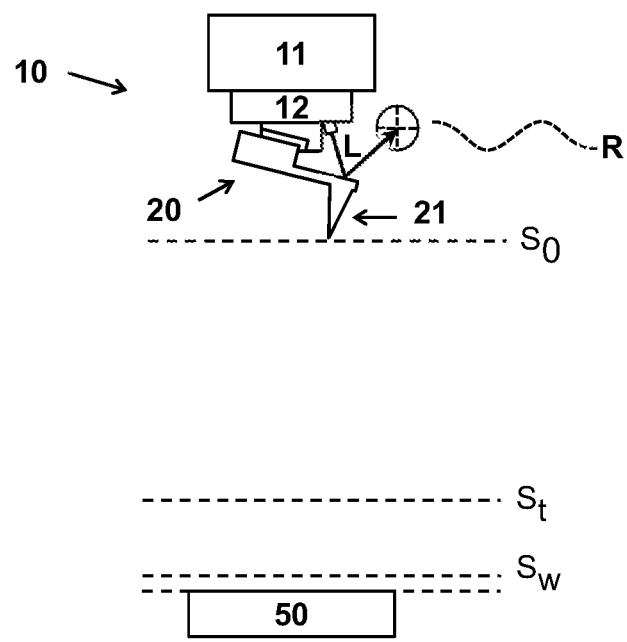
FIGS. 1A and 1B schematically illustrate an SPM system and aspects of a known two-stage landing procedure.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1B:
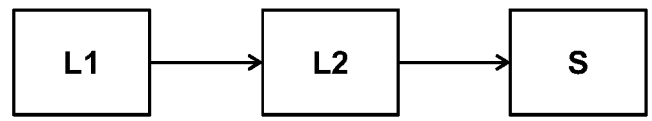

For easy of understanding a known automated two-stage landing procedure will be illustrated with reference to FIGS. 1A and 1B. FIG. 1A depicts an SPM head 10, including a coarse 11 and fine means 12 and a controller to provide relative motion between a substrate 50 and a tip 21 of a probe 20 held by the head. FIG. 1B schematically illustrates a method of operating an SPM system, including a landing procedure including: a first landing stage L1 comprising a coarse translation and a second landing stage L2, comprising a fine translation; and a scanning stage S, following the landing procedure. Before probing, sampling, the substrate the tip needs to be brought to a working separation Sw from the substrate, e.g. at a distance allowing intermittent contact. FIG. 1A depicts the system with the probe tip positioned as an initial separation S0 far from the substrate, i.e. at the start of the landing procedure L1.

The first stage of the automated landing procedure involves a coarse motion to bring the tip from initial separation to a more proximate separation. To avoid crashing the tip into the substrate the coarse motion is applied step-wise under continuous monitoring of a response signal R. When a desired condition is reached, e.g. an observed phase shift, as the probe and substrate come in close proximity from each other, the coarse motion is halted. From this position, also referred to as a transition separation, the probe is then accurately guided to the sampling position in the second landing phase L2, comprising using a fine translation, e.g. by a piezo scanner.

Figure 2A:
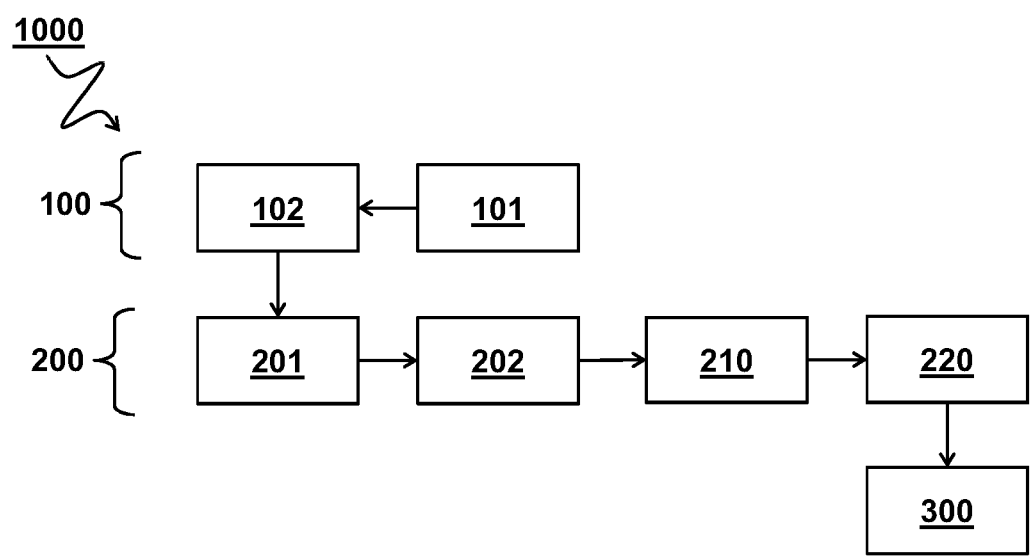
FIGS. 2A and 2B schematically illustrate a method of operating an SPM system including a landing procedure and a system in accordance with the present disclosure.
Figure 2B:
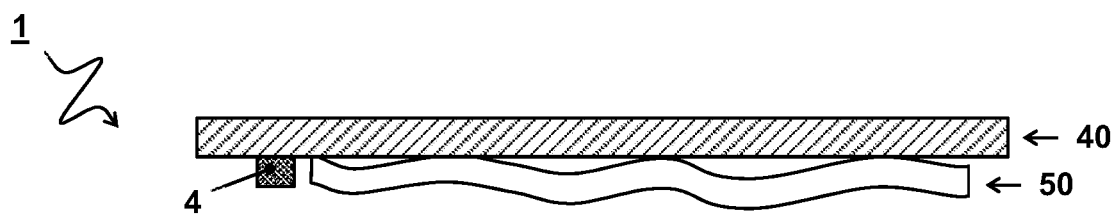
Figure 2B:
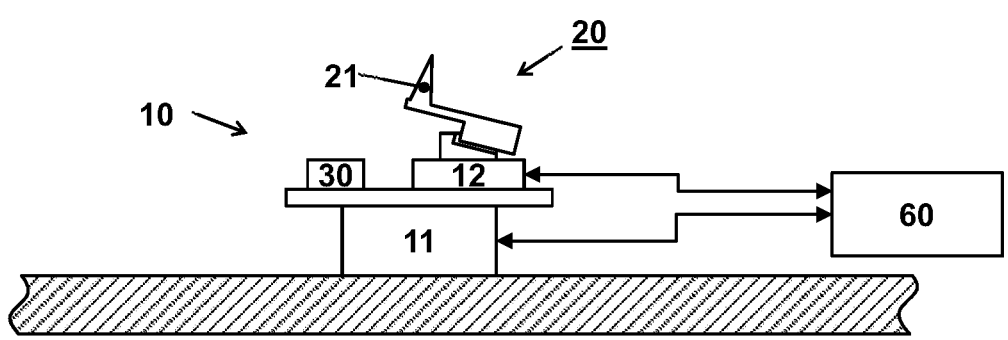

FIGS. 2A and 2B respectively schematically illustrate a method 1000 of operating an SPM system according to the present disclosure, and an SPM system 1 configured to perform the method.

The method, as schematically depicted in FIG. 2A comprises at least a landing procedure 200. Following the landing procedure there can be one or more measurements, or probing phases 300, wherein one or more areas of interest of one or more substrates are probed. The landing procedure 200 comprises: a first (coarse) landing stage 210, a second (fine) landing stage 220, and prior thereto a stage 201 of measuring an initial optical distance and relating 202 the measured initial optical distance to a reference distance so as to determine a deviation. The reference distance and deviation will be used to determine the actuation distance covered during the first coarse landing stage. The reference distance is a parameter that is determined in a prior training (or calibration) routine 100. It will be appreciated that once the reference distance is determined the training or calibration routine 100 need not be repeated before each and every probing phase 300. Once determined the reference parameter can be used repeatedly, e.g. for a plurality of measurement areas along a substrate of interest and/or for a plurality of substrates, irrespective of variations in an initial separation between probe tip and target measurement area, e.g. due to substrate roughness and/or variations in apparent substrate thickness.

FIG. 2B illustrates an SPM system 1 configured to perform the method according to the present disclosure. The system comprises an SPM head 10, including means for holding a probe 20 with probe tip 21 for probing a substrate to be probed 50. The system as shown further comprises a sample stage 40 for holding the substrate and a fiducial 4 provided to the sample stage, and a controller 60. The controller is communicatively connected to translation means, including a fine translation means 12, and a coarse translation means 11, for providing relative motion between the probe tip and the substrate. As shown, the method and the system further comprises a means, detector 30, to optically determine a distance, optical distance, to the substrate). As will become apparent the method and system can be used to particular advantage, offering improved landing, on a variety of samples, including samples larges, e.g. full size wafers, or samples that comprise variations in apparent height, as shown with exaggerated undulations for clarity.

These and further aspects of the method and corresponding features of system will be elucidated in more detail with references to FIGS. 3-7.

Figure 3A:
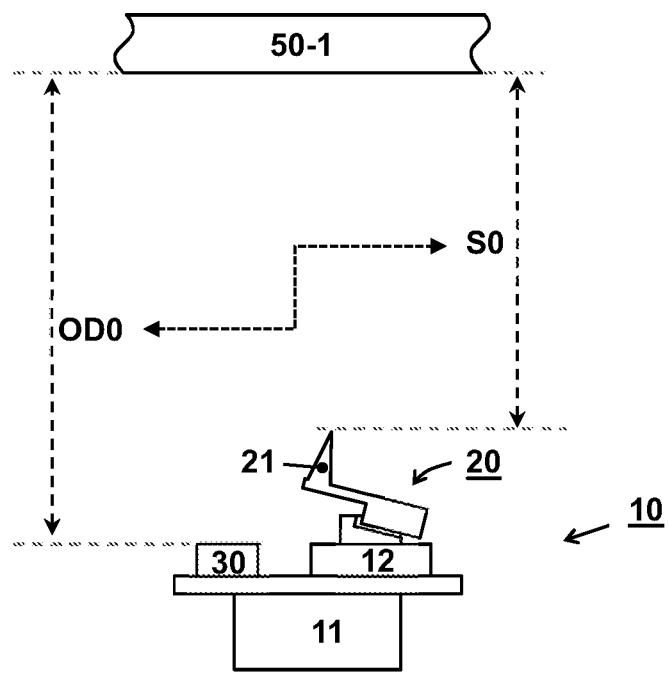
FIGS. 3A and 3B schematically illustrate a system at various stages during a landing procedure.
Figure 3B:
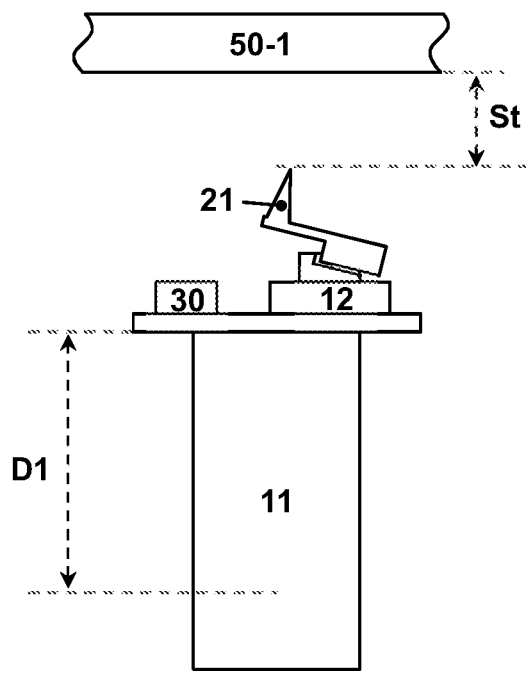
Figure 5A:
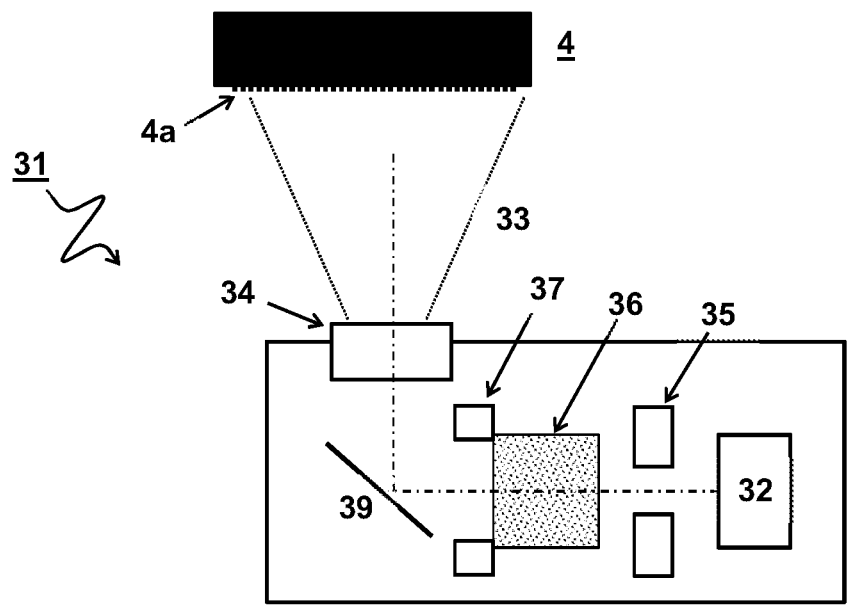
FIGS. 5A and 5B schematically illustrate aspects of measuring a distance.
Figure 5B:
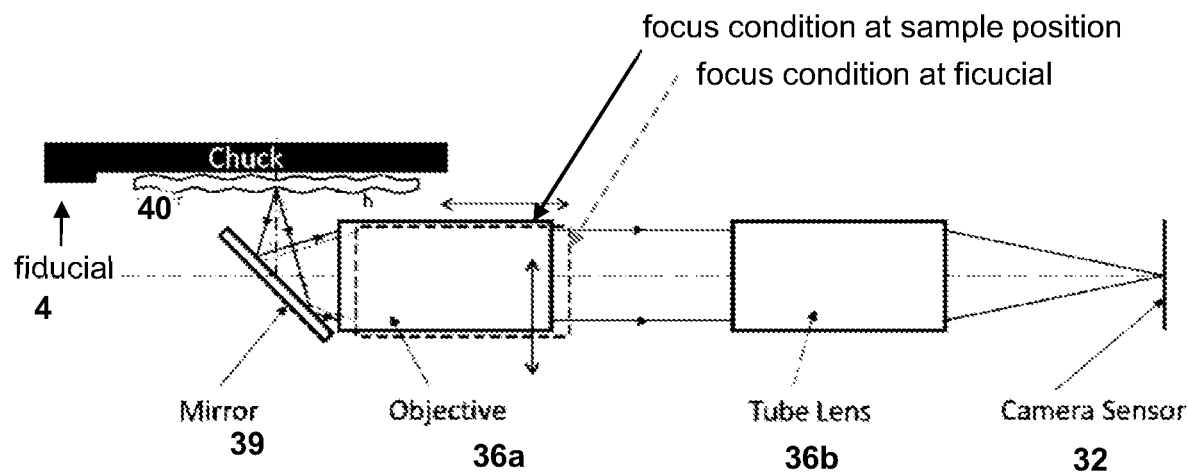

FIGS. 3A and 3B schematically illustrate an SPM system at various stages during a landing procedure. FIG. 3A depicts the system in a state wherein the probe tip is still far from the substrate, e.g. prior to starting the coarse first landing stage. Using a lateral translation the head is positioned across a relevant first landing 50-1 area along the substrate to be probed. Prior to applying the first coarse translation an optical distance OD0 is measured between the substrate and a detector 30. Since the optical distance to the substrate is determined from a position with a fixed relation to a means for holding the probe the optical distance can be associated to a separation distance between substrate and probe tip, in this case the initial separation S0. As will be explained in relation to FIGS. 5A and 5B the optical distance is preferably determined by determining a focusing condition of an optical distance sensor provided to the SPM head 10. In a preferred embodiment, e.g. as shown in FIG. 5A, the optical distance sensor can be understood to relate to a mark sensor 31. As used herein a mark sensor can be understood to relate to a miniature or integrated microscope system.

FIG. 3B shows the same system in a state after applying the coarse first translation over an actuation distance D1. For ease of understanding the applied actuation distance is represented by an corresponding apparent increased dimension of coarse translation means 11.

Typically, the translation means 11 comprises a stepper motor, providing a fixed translation distance with each step applied. It will be understood that the translation distance may be provided by alternative or a combination of translation means such as screw drives. Likewise it will be understood that the translation can be provided with equal effect by translating the substrate. The first actuation distance D1 corresponds a reference distance and a deviation so as to correspond to a distance required to bring the probe to a transitional separation distance St from the substrate. Details as to the determination of the reference distance and the deviation which will be explained in relation to FIG. 4. As opposed to conventional landing methods, the first (coarse) translation distance D1 can be safely applied, e.g. by instructing the coarse translation means 12 to apply the specified distance in a single go, without requiring manual or automated feedback control during the coarse translation to monitor a response as the probe tip in brought in proximity to the substrate. After providing the coarse translation the second landing stage can be started to accurately bring the probe in contact with the substrate at the desired location.

Figure 4A:
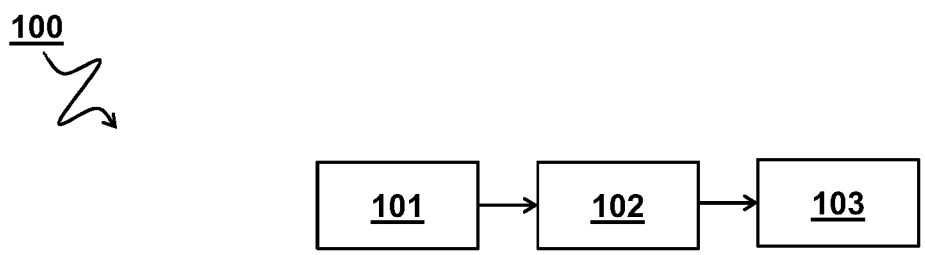
FIG. 4A schematically illustrates a calibration routine.
Figure 4B:
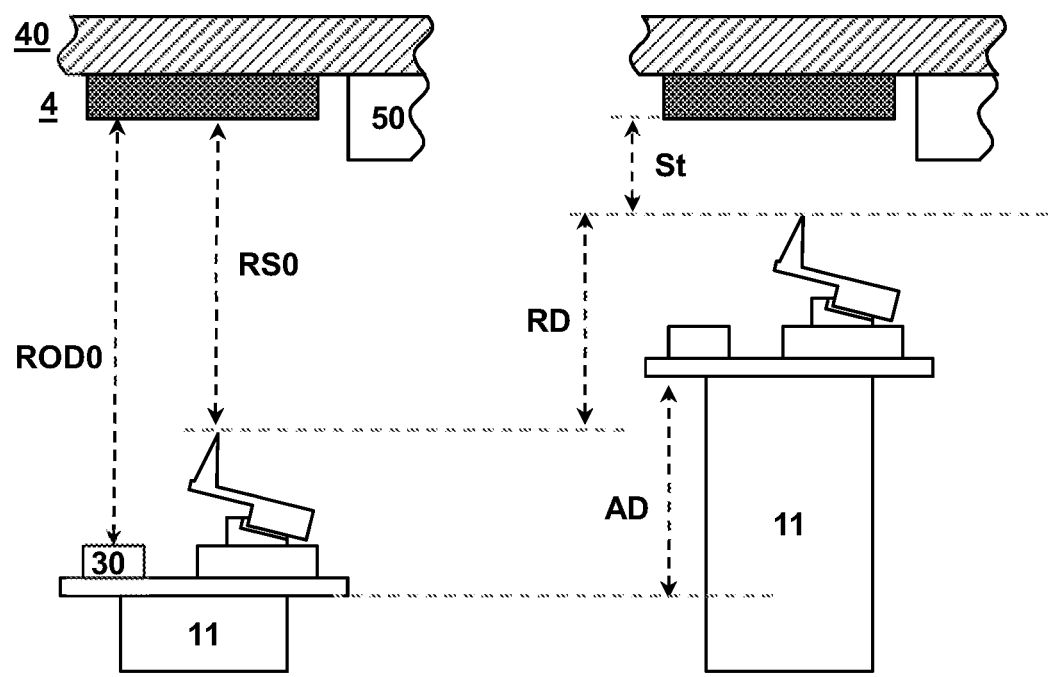
FIG. 4B schematically illustrates a system at various stages during a calibration routine.

FIG. 4A schematically illustrates a calibration routine. FIG. 4B schematically illustrates an SPM system at various stages during a calibration routine.

The calibration or training routine 100 includes at least a step of determining 102 a reference optical distance ROD0. This reference optical distance can be associated to a reference separation RS0 between the probe tip and a reference 4 (see FIG. 4B, left). In the embodiment shown, the reference is formed by a fiducial 4 provide onto a sample stage 40 at a position in the direct vicinity of a sample 50 position.

Starting with the probe tip from the reference separation RS0 (See FIG. 4B, left) the probe is brought towards to the substrate in a second step 102. In the second step the reference distance RD is determined by recording an actuation distance AD required to bring the probe tip 21 from the reference separation RS0 to a second, more proximal, reference separation St as defined by an observed characteristic transitional response of the probe tip in proximity to the reference 4 (See FIG. 4B), e.g. by step-wise activating the stepper motor 11, while monitoring a response signal (R, see FIG. 1) until the specific characteristic transitional response is observed. It will be understood, that while it may be preferred to perform the calibration or routine on a fiducial it is also envisioned to perform the calibration or training routine on a reference position along a substrate to be probed or even on a fixed position along the system, e.g. a part of a metro frame serving as mount for the sample stage and/or SPM head.

In some embodiments, e.g. as shown in FIG. 4A, the calibration or training routine further includes a determining 103 a second reference distance by recording a fine actuation distance required to bring the probe tip from the second, more proximal, reference separation St to a working separation from the reference.

In other or further embodiments, the determining the reference distance (or second reference distance) comprises recording an actuation parameter for the coarse translation means (or fine translation means) associated to the required actuation distance. For example, if the coarse translation is provided by a stepper motor, the translation distance can be correlated to an applied, e.g. counted, number of translation steps. Alternatively or additionally, depending on the type of translation means, the translation distance may be correlated to a drive potential or actuation time.

Having determined, trained the system as to, which coarse actuation distance (reference distance) is suitable for a given corresponding reference optical distance, the determined reference distance can be suitably applied and adjusted at a given target sample position by measuring the corresponding optical distance for that position. If the corresponding optical distance OD0 at a specific measurement position corresponds to the reference optical distance ROD0 (i.e. no deviation) the corresponding reference distance can be directly applied. In case there is a deviation, e.g. by 10%, the corresponding first actuation distance can be adjusted accordingly, e.g. by multiplying the actuation parameter (e.g. number of coarse translation steps) by a factor 1.1.

The calibration or training routine is performed at least once before performing a first measurement routine on a given first substrate to be probed. In some embodiments the calibration or training routine is performed once for each substrate to be probed. Alternatively, or in addition, the calibration or training routine can be performed repeatedly, e.g. between consecutive measurements on individual ones of a plurality of target measurement areas on a substrate to be probed, e.g. to increase a confidence level or to correct for time dependent changes.

Preferably, measuring the optical distance comprises determining a focusing condition of an optical distance sensor provided. Preferably, the optical distance sensor is configured to determine a focus condition by automatically adjusting a focal distance so as to shift its focal plane. Alternatively, or in addition, the optical distance can be determined using alternate optical principles including interferometry and/or by measuring a time of light, e.g. laser pulses.

In some embodiments, e.g. as shown in FIG. 5A, the optical distance sensor is a mark sensor 31, such as a registration mark sensor, comprising an objective which is automatically adjustable relative to a camera sensor to determine the best focus condition by checking image sharpness. Accordingly, the condition, e.g. position of the objective, at best focus can be correlated to an optical distance. A deviation between an initial optical distance measured at a fiducial and at a sample position can be associated to a deviation in focus condition (See FIG. 5B and the position of the objective).

The mark sensor 31 includes a miniature camera unit 32 having a field of view 33 through its sensor opening 34. The optical sensor 31 further comprises an aperture 35, adjustable focusing optics 36 (typically including an objective 36a and a tube lens 36b), and actuators 37 to adjust the distance between the camera 32 and the focusing optics 36 for enabling focusing of the image of the fiducial 4 and/or substrate.

Preferably, the mark sensor 31 includes a redirection mirror 39 which makes an angle of $\pi/4$ with the longitudinal axis through the sensor in order optimize an space available parallel in the head by redirecting the imaging plane onto the surface of the substrate.

The camera 32 must be accurate enough to be able to recognize marks 4a on the fiducial. The sizes of such marks are typically within a range of 20*20 micrometer up to 50*50 micrometer, but of course the size these marks may vary and may become smaller over time. The resolution of the image features of alignment marks may typically be down to 1 micrometer, which may likewise be subject to change (i.e. decrease) over time. The camera 32 may be adapted accordingly dependent on the size and/or resolution of the alignment marks, and should be able to distinguish the necessary image features in order to carry out its task. For example, pixel resolution of camera 32 in the object plane (e.g. surface to be read, may be smaller than or equal to 2 micrometer, preferably smaller than or equal to 1.0 micrometer, more preferable smaller than or equal to 0.5 micrometer. Furthermore, magnification of the camera may be 5 to 100 times, preferably to 50 times, and the camera may be able to operate with at least two magnification factors for low and high magnification.

Figures 6A, 6B:
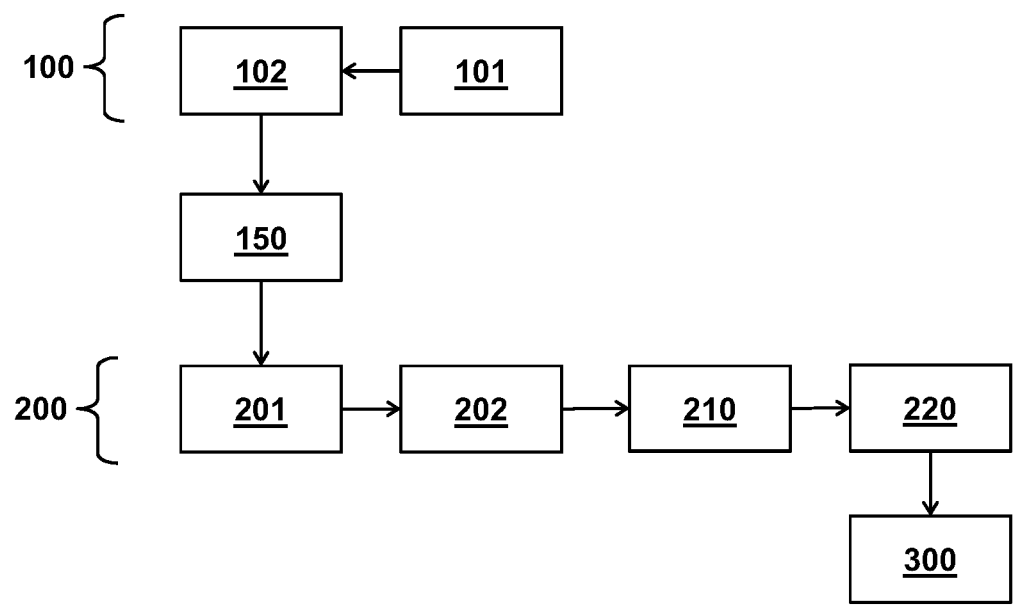
FIGS. 6A and 6B schematically illustrates a method of operating an SPM system and a height map.

In preferred embodiments, e.g. as illustrate in FIGS. 6A and 6B, the method comprises a step 150 of recording an optical height map 151. including mapping out optical height records for individual ones of a plurality of target measurement areas along a substrate 40.

The height map includes optical height records RD covering individual ones (50-1, 50-2, ... , 50-n, see FIG. 7) of a plurality of target measurement areas along the substrate 50 relative to a marker having a fixed relation to the substrate to be probed, preferably the fiducial.

Typically the optical height is determined by scanning the head including the optical distance sensor across the substrate and recording the best focusing condition so as to cover each of the target measurement areas relative to the marker. In this way the first translation over the first actuation distance RD by the coarse translation means can be mapped out for each of the target measurement areas.

It will be appreciated that the optical distance need not be measured at each individual target measurement area, depending on the field of view of the sensor and/or the expected variations in surface height at least part of the optical height records can be extrapolated from one more adjacent measurement points.

Figure 7:
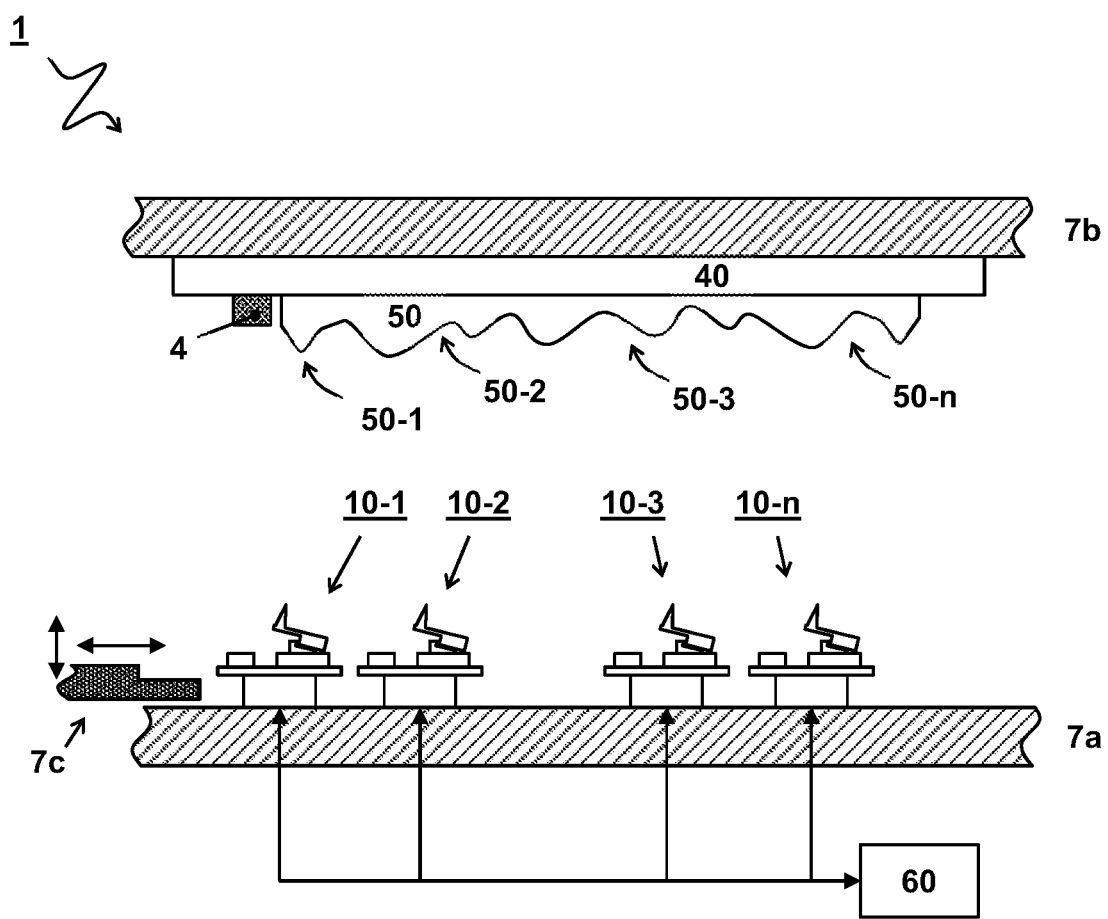
FIG. 7 schematically illustrates an SPM system.

FIG. 7 schematically depicts an embodiment of an SPM system 1 comprising a plurality of individually addressable ones of the SPM head 10, e.g. as shown in FIG. 2B. The heads (10-1 to 10-n) comprise individual ones of the fine and course translation means connected to a controller 60. A system comprising a plurality of SPM heads is advantageously able to simultaneously address a plurality of target measurement areas (50-1, 50-2, through 50-$n$), e.g. on a large substrate and/or plurality of adjacently placed substrates.

In one embodiment, e.g. as shown, the heads are distributed along a first end 7*a* of s support frame (metro frame) opposite a second end 7*b* of the frame that supports the substrate carrier 40 and a fiducial 4. Positioning the heads across relevant targets along the opposite end of the frame (including substrate 50 and fiducial 4) so parallel operation of the method according to the present disclosure. In a preferred embodiment, the system comprises one or more robot arms (7*c*) to accurately position the heads at target locations along the frame 7*a*, e.g. along a reference grid provided thereon. The reference distance for each of the heads can be determined by sequentially positioning each head opposite the fiducial. Optionally, the system can be provided with a plurality of fiducials, e.g. distributed along a perimeter of a substrate to be probed, so as to minimize lateral translation time to and from the fiducial.

Advantageously, the height map can be determined by one or more of the plurality of the heads by providing suitable lateral translation, e.g. by scanning a head including a mark sensor, by the robot arm along the substrate. Advantageously the height records determined in the map can be applied to advantage for each of the heads since the reference height is correlated to a fixed reference point.

For the purpose of clarity and a concise description, features are described herein as part of the same or separate embodiments, however, it will be appreciated that the scope of the invention may include embodiments having combinations of all or some of the features described.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A method of operating a scanning probe microscopy (SPM) system comprising a landing procedure comprising:
   a first landing stage including: applying a first translation over a first actuation distance by a coarse translation means to bring a probe tip held by an SPM head from an initial separation from a substrate to be probed to a second, more proximal, separation as defined by a characteristic transitional response of the probe tip in proximity to the substrate,
   a second landing stage including: applying a second translation, following the first translation, over a second actuation distance by a fine translation means under feedback control to bring the probe tip to a working separation, and
   measuring an initial optical distance, indicative of the initial separation, using a detector, and
   relating the measured initial optical distance to a reference distance so as to determine a deviation;
   wherein, the first actuation distance corresponds the reference distance and the deviation.

2. The method according to claim 1, wherein measuring the optical distance using the detector comprises determining a focusing condition of an optical distance sensor provided to the SPM head.

3. The method according to claim 2, including a prior calibration routine to determine the reference distance, said routine including:
   measuring a reference optical distance associated with the probe tip held by the SPM head positioned at a reference separation from a reference, and
   determining the reference distance as defined by a recorded actuation distance required to bring the probe tip from the reference separation to a second, more proximal, reference separation as defined by an observed characteristic transitional response of the probe tip in proximity to the reference.

4. The method according to claim 1, including a prior calibration routine to determine the reference distance, said routine including:
   measuring a reference optical distance associated with the probe tip held by the SPM head positioned at a reference separation from a reference, and
   determining the reference distance as defined by a recorded actuation distance required to bring the probe tip from the reference separation to a second, more proximal, reference separation as defined by an observed characteristic transitional response of the probe tip in proximity to the reference.

5. The method according to claim 4, wherein determining the reference distance comprises recording an actuation parameter for the coarse translation means associated to the required actuation distance.

6. The method according to claim 5, wherein the calibration routine further includes determining a second reference distance by recording a fine actuation distance required to bring the probe tip from the second, more proximal, reference separation to a working separation from the reference.

7. The method according to claim 4, wherein the calibration routine further includes determining a second reference distance by recording a fine actuation distance required to bring the probe tip from the second, more proximal, reference separation to a working separation from the reference.

8. The method according to claim 1, wherein the reference distance is defined relative to a fiducial provided to a stage for holding the substrate.

9. The method according to claim 1, further comprising a step of recording an optical height map including optical height records for individual ones of a plurality of target measurement areas along the substrate relative to a marker.

10. The method according to claim 9, wherein the marker is a fiducial provided to a stage for holding the substrate.

11. The method according to claim 1, wherein the SPM system comprises a plurality of individually addressable ones of the SPM head, each individually translatable by corresponding ones of the coarse and fine translation means, and wherein the landing procedure is applied to individual ones of the plurality of SPM heads.

12. The method according to claim 1, comprising an intermediate translation between the first and the second translation, said intermediate translation including an intermediate translation by the fine translation means without feedback control, wherein the intermediate translation is provided over a distance that corresponds to a fraction of the second reference distance.

13. A non-transitory computer-readable medium comprising instructions, which when loaded into a memory of a scanning probe microscopy system, enable a controller of the system to carry out the method of claim 1.

14. A scanning probe microscopy (SPM) system comprising an SPM head for probing a substrate to be probed with a probe tip, a controller, and a translation means for adjusting a separation between the probe tip and the substrate, the translation means communicatively connected to the controller, and including a course translation means for bringing the probe tip from an initial separation from the substrate to a more proximal separation, and a fine translation means for bringing the probe tip to a working separation, wherein the SPM system is configured for performing a landing procedure including applying a first translation over a first actuation distance by the coarse translation means to bring a probe tip held by an SPM head from an initial separation from a substrate to be probed to a second, more proximal, separation as defined by a characteristic transitional response of the probe tip in proximity to the substrate, and applying a second translation, following the first translation, over a second actuation distance by the fine translation means under feedback control to bring the probe tip to a working separation, and measuring an initial optical distance, indicative of the initial separation, using a detector, and relating the measured initial optical distance to a reference distance so as to determine a deviation;

wherein, the first actuation distance corresponds to a predetermined reference actuation distance associated to the reference distance and the deviation.

15. The SPM system according to claim 14, wherein the detector is an optical distance sensor provided to the SPM head configured for determining a focusing condition.

16. The SPM system according to claim 15 wherein the SPM system comprises a fiducial provided to a stage for holding the substrate.

17. The SPM system according to claim 14 wherein the SPM system comprises a fiducial provided to a stage for holding the substrate.

18. The SPM system according to claim 14, wherein the SPM system is further configured for performing a step of recording an optical height map including optical height records for individual ones of a plurality of target measurement areas along the substrate relative to a marker.

19. The SPM system according to claim 18, wherein the marker is a fiducial provided to a stage for holding the substrate.

20. The SPM system according to claim 14, comprising a plurality of individually addressable ones of the SPM head.

* * * * *